United States Patent
Schmitt

(10) Patent No.: US 10,328,882 B2
(45) Date of Patent: Jun. 25, 2019

(54) ROLLOVER PROTECTIVE BODY FOR A ROLLOVER PROTECTIVE DEVICE OF A MOTOR VEHICLE

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 57 days.

(21) Appl. No.: 15/614,688

(22) Filed: Jun. 6, 2017

(65) Prior Publication Data

US 2017/0349129 A1    Dec. 7, 2017

(30) Foreign Application Priority Data

Jun. 6, 2016    (DE) .................. 10 2016 110 439

(51) Int. Cl.
*B60R 21/13*    (2006.01)

(52) U.S. Cl.
CPC ........ *B60R 21/13* (2013.01); *B60R 2021/132* (2013.01)

(58) Field of Classification Search
CPC .................. B60R 21/13; B60R 2021/132
See application file for complete search history.

(56) References Cited

U.S. PATENT DOCUMENTS

| | | | |
|---|---|---|---|
| 5,094,478 A | 3/1992 | Pfanzeder et al. | |
| 5,819,408 A * | 10/1998 | Catlin | B62D 21/15 29/897.2 |
| 6,233,826 B1 * | 5/2001 | Wycech | B29C 44/1242 29/897.1 |
| 6,315,326 B1 * | 11/2001 | Muller | B60R 21/13 280/756 |
| 2004/0130185 A1 | 7/2004 | Hasler et al. | |
| 2006/0170203 A1 * | 8/2006 | Nowack | B60R 21/13 280/756 |
| 2008/0309126 A1 * | 12/2008 | Beierl | B60J 1/1823 296/216.01 |
| 2015/0251622 A1 * | 9/2015 | Pronello | B60R 21/13 296/190.03 |
| 2016/0257274 A1 * | 9/2016 | Schmitt | B60R 21/13 |
| 2016/0368446 A1 * | 12/2016 | Schmitt | B60R 21/13 |
| 2017/0106918 A1 * | 4/2017 | Diller | B60R 3/002 |

(Continued)

FOREIGN PATENT DOCUMENTS

| | | |
|---|---|---|
| DE | 39 25 515 | 1/1991 |
| DE | 298 12 841 | 11/1998 |
| DE | 102 23 420 | 3/2003 |

(Continued)

OTHER PUBLICATIONS

German Search Report dated Feb. 20, 2017.

*Primary Examiner* — Karen Beck

(74) *Attorney, Agent, or Firm* — Gerald E. Hespos; Michael J. Porco; Matthew T. Hespos

(57) ABSTRACT

A rollover protective device for a motor vehicle has a rollover protective body (1) with a top side. A deformation cross bar (2) is attached to the top side of the rollover protective body (1) and has hollow profile body (3). The deformation cross bar (2) has at least one reinforcing body (4) inserted into the hollow profile body (3).

9 Claims, 13 Drawing Sheets

(56) References Cited

U.S. PATENT DOCUMENTS

2017/0349129 A1* 12/2017 Schmitt .................. B60R 21/13
2017/0361799 A1* 12/2017 Schmitt .................. B60R 21/13

FOREIGN PATENT DOCUMENTS

| DE | 10218701 C1 * | 6/2003 | ............ B60R 21/13 |
|----|----|----|----|
| DE | 10 2007 040 765 | 3/2009 | |
| DE | 10 2009 011 066 | 9/2010 | |
| WO | 02/074608 | 9/2002 | |
| WO | WO-2018151636 A1 * | 8/2018 | ............ B60R 21/13 |

* cited by examiner

ROLLOVER PROTECTIVE BODY FOR A ROLLOVER PROTECTIVE DEVICE OF A MOTOR VEHICLE

CROSS REFERENCE TO RELATED APPLICATION

This application claims priority under 35 USC 119 to German Patent Appl. No. 10 2016 110 439.6 filed on Jun. 6, 2016, the entire disclosure of which is incorporated herein by reference.

BACKGROUND

1. Field of the Invention

The invention relates to a rollover protective body for a rollover protective device of a motor vehicle. The top side of the rollover protective body has a deformation cross bar that comprises a hollow profile body.

2. Description of the Related Art

Rollover protective devices for motor vehicles are known in various embodiments from the prior art. These rollover protective devices are used in convertibles to increase the safety of the vehicle occupants in the event of overturning. Rollover protective devices have a number of extendable rollover protective bodies that are assigned respectively to the vehicle seats of the motor vehicle and are guided in a guide body that is fixed to the vehicle body and is designed in the manner of a cassette. In a normal driving state, the rollover protective bodies are in a retracted position. If a corresponding sensor system senses an imminent overturning of the motor vehicle, the rollover protective bodies are automatically transferred into an extended position to protect the vehicle occupants against injuries.

DE 102 23 420 C2 discloses a rollover protective device with a rollover protective body. The top side of said rollover protective body has a deformation cross bar that is designed as a hollow profile body and forms a defined predetermined deformation point for a limited, defined deformation travel in the load direction in accordance with a predetermined force-travel diagram for energy absorption purposes.

It is the object of the invention to provide a rollover protective body for a rollover protective device of a motor vehicle having improved mechanical properties.

SUMMARY

A rollover protective body according to the invention is distinguished in that the deformation cross bar comprises at least one reinforcing body that is inserted into the hollow profile body. It has been shown that the mechanical stability and the energy absorption behavior of the deformation cross bar in the event of a crash can be considerably improved by introducing at least one reinforcing body into the hollow profile body. The reason for this is that the reinforcing body is capable of both increasing the mechanical stability and absorbing energy during a deformation in the event of a crash and thereby reducing the mechanical loading of the supporting structure. During the assembly, the reinforcing body can be inserted into the hollow profile body in a simple manner on one of the two end sides. The reinforcing body can be fixed by local hook-behind elements within the hollow profile body.

The deformation cross bar may comprise plural reinforcing bodies that are inserted into the hollow profile body. For example, reinforcing bodies can be inserted into the hollow profile body on each of the two ends of the hollow profile body, and therefore the hollow profile body can be closed on the ends by one reinforcing body in each case. The reinforcing bodies here can be configured to captively interlock with each other.

The reinforcing body may be made from a metallic material. Alternatively, each reinforcing body may be produced from plastic, in particular from a fiber-reinforced polyamide. The advantage of this embodiment is that reinforcing bodies made of plastic can be produced very simply and cost-effectively. Furthermore, additional functions, such as an edge protective radius on the profile end of the hollow profile body or an at least partial covering of penetration elements for the penetration of the rear window of the motor vehicle in the event of a crash, can be integrated very simply into the reinforcing bodies made of plastic. Furthermore, holding means can be integrated in a simple manner into reinforcing bodies made of plastic. The holding means may be designed for mutually fixing two mutually opposite reinforcing bodies by interlocking or clipping together.

Each reinforcing body can have a reinforcing structure that is formed from a plurality of reinforcing segments. The reinforcing segments can be adapted in respect of their structural and mechanical properties in such a manner that "customized" mechanical properties can be provided for the reinforcing body in respect of its mechanical stability and its energy absorption capability.

Each of the reinforcing segments may have a cavity bounded by a number of lateral boundary walls. The cavities save on material and form deformation spaces of the reinforcing segments in an advantageous manner in the event of a crash.

The reinforcing segments can be arranged in at least two rows next to one another. Each of the rows may be formed by a number of reinforcing segments that are arranged one above another in pairs and each having a common lateral boundary wall.

To further improve the stabilization and deformation behavior of the reinforcing structure, at least one of the lateral boundary walls may have a height offset in relation to the other lateral boundary walls.

The reinforcing segments may be arranged one above another in at least two planes. The planes may have a lateral offset from one another in at least one direction in space. This lateral offset has a positive effect on the mechanical properties of the reinforcing segments.

The lateral offset between the planes may be selected so that the reinforcing segments can penetrate into one another under the action of a load. Thus, the deformation travel can be increased in an advantageous manner.

The reinforcing segments may be hexagonal, oval, circular, rectangular or square in cross section. These shapes have proven to be particularly expedient designs.

The rollover protective body may have at least one conical penetration element that is attached to the hollow profile body, namel to an end side of the hollow profile body. This conical penetration element is designed to penetrate a rear window of the motor vehicle after the triggering of the rollover protective body in the event of overturning. A conical penetration element can be provided on each of the two mutually opposite ends of the hollow profile body.

Further features and advantages of the invention become clear with reference to the description below of preferred exemplary embodiments with reference to the attached figures.

DETAILED DESCRIPTION

Figure 1:
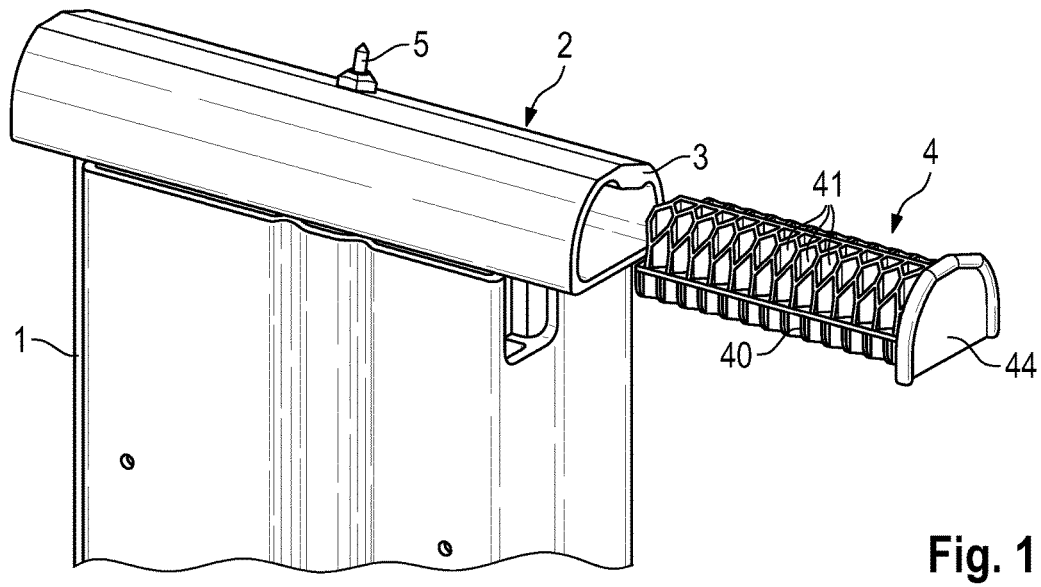
FIG. 1 shows a perspective, exploded illustration which shows a rollover protective body for a rollover protective device of a motor vehicle according to a first exemplary embodiment of the present invention.
Figure 2:
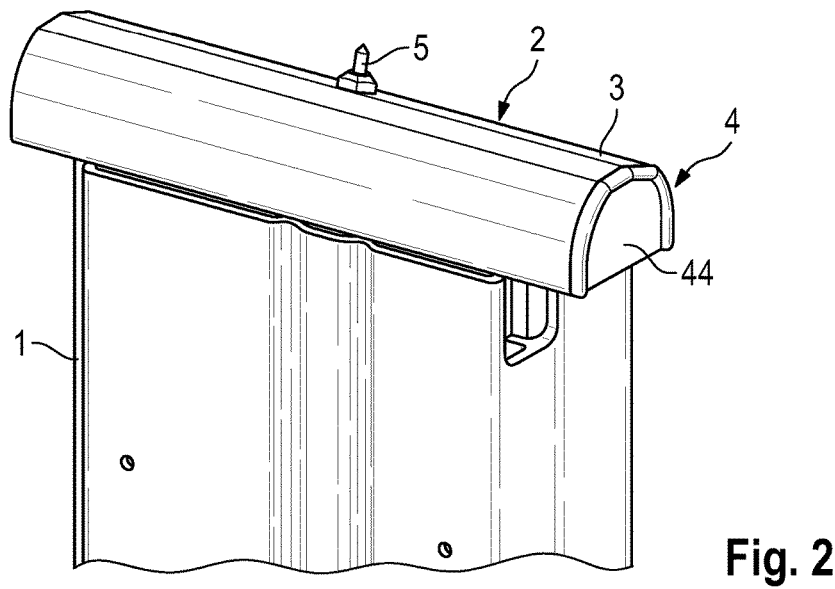
FIG. 2 shows a perspective view which shows the rollover protective body according to FIG. 1 after the installation of a reinforcing body.

With reference to FIGS. 1 and 2, the top side of a rollover protective body 1 for a rollover protective device of a motor vehicle has a deformation cross bar 2 with a hollow profile body 3. The hollow profile body 3 can be produced from light metal (for example from aluminum) or steel. Each vehicle seat of the motor vehicle is assigned a rollover protective body 1 of this type that can be guided in a guide device that is fixed on the vehicle body and is designed in the manner of a cassette. In a normal driving state of the motor vehicle, the rollover protective body 1 is in a retracted position. If a corresponding sensor system senses an imminent overturning of the motor vehicle, the rollover protective body 1 is transferred automatically into an extended position to protect the vehicle occupants against injuries.

One or more reinforcing bodies 4 are inserted into the hollow profile body 3 on the ends to reinforce the deformation cross bar 2 of the rollover protective body 1 and to improve the mechanical properties of the deformation cross bar 2. FIG. 1 shows one of these reinforcing bodies 4 that is formed as a single piece and is produced from plastic, in particular from a fiber-reinforced polyamide. The reinforcing body 4 has a reinforcing structure 40 that engages into the interior of the hollow profile body 3 and is formed from a multiplicity of reinforcing segments 41 that are hexagonal or are partially hexagonal in the edge regions. The reinforcing segments 41 that are hexagonal in shape or are at least partially hexagonal in shape form a honeycomb-like structure that is adapted to the inner contour of the hollow profile body 3. The end of the reinforcing body 4 has an end element 44 with an outer contour adapted to the outer contour of the hollow profile body 3. The reinforcing body 4 can be fixed within the hollow profile body 3 by local hook-behind elements. A reinforcing body 4 of this type can be provided on a second end side of the hollow profile body 3 that lies opposite the first end side.

An upper end of the hollow profile body 3 has a penetration element 5 that is pin-shaped in this embodiment and is designed to penetrate a rear window of the motor vehicle when the rollover protective body 1 is extended in the event of overturning.

Figure 3A:
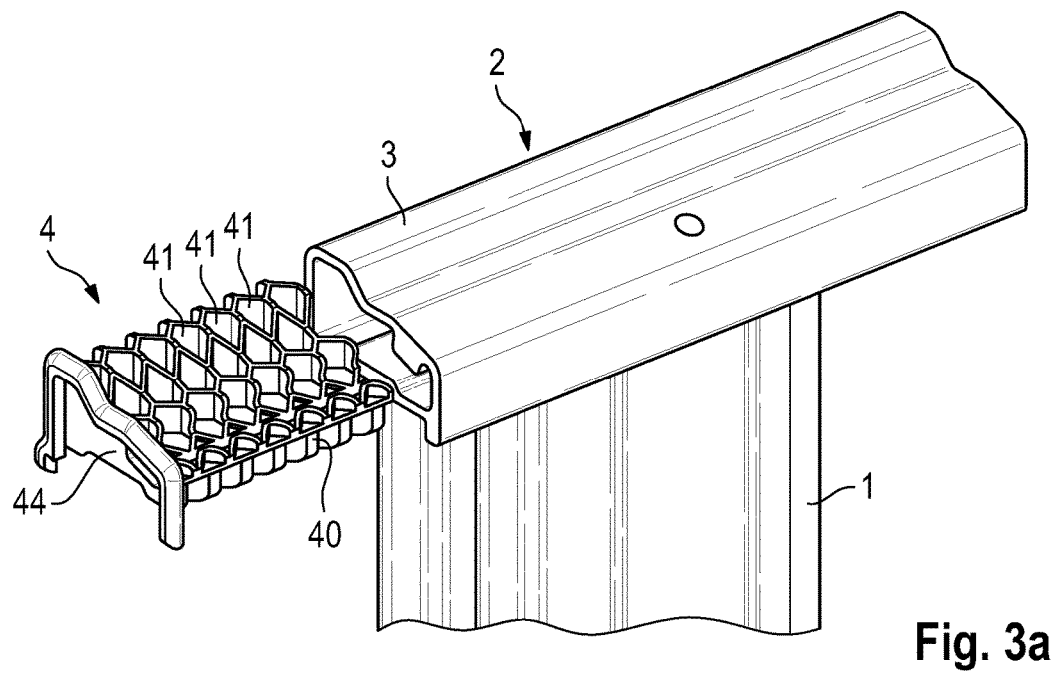
FIG. 3a shows a perspective, exploded illustration which shows a rollover protective body for a rollover protective device of a motor vehicle according to a second exemplary embodiment of the present invention.
Figure 3B:
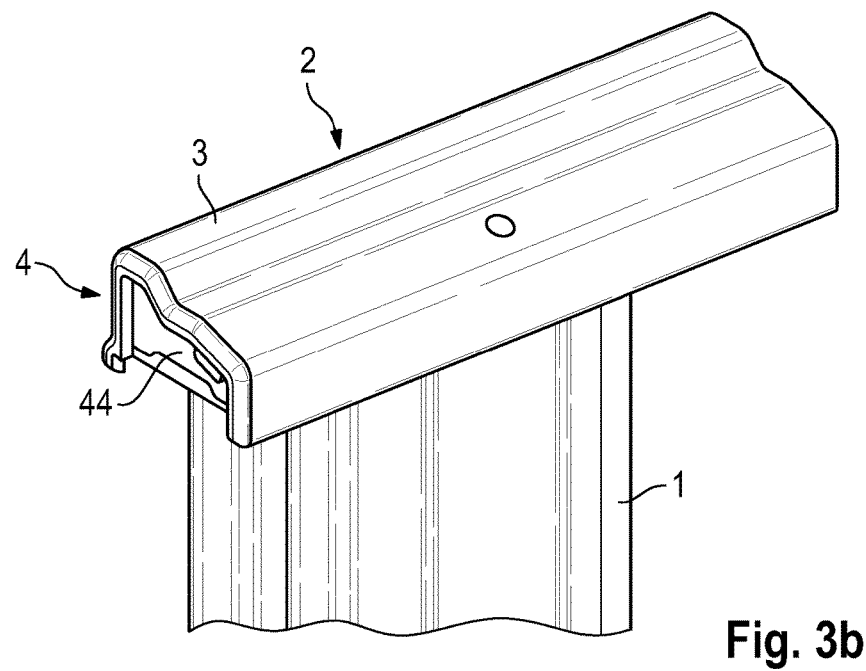
FIG. 3b shows a perspective view which shows the rollover protective body according to FIG. 3 after the installation of a reinforcing body.

With reference to FIGS. 3a and 3b, the second embodiment of the rollover protective body 1 differs from the first embodiment by a different cross-sectional shape of the hollow profile body 3 and by a reinforcing body 4 that is adapted to the cross-sectional shape and contour configuration of the hollow profile body 3. The reinforcing segments 41 of the reinforcing structure 40 are hexagonal or at least partially hexagonal in the edge regions.

Figure 4A:
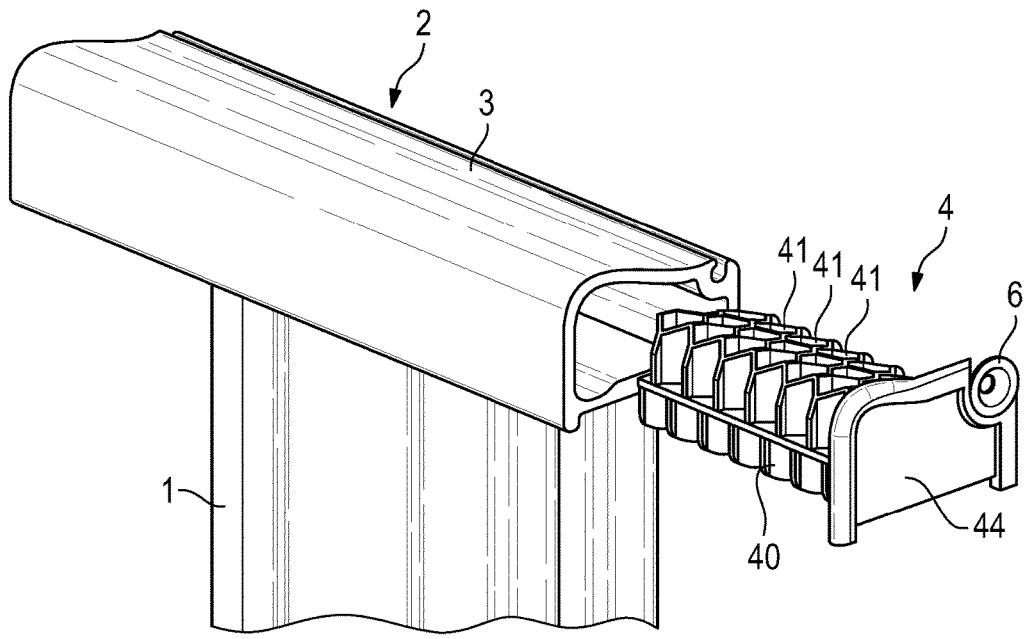
FIG. 4a shows a perspective, exploded illustration which shows a rollover protective body for a rollover protective device of a motor vehicle according to a third exemplary embodiment of the present invention.
Figure 4B:
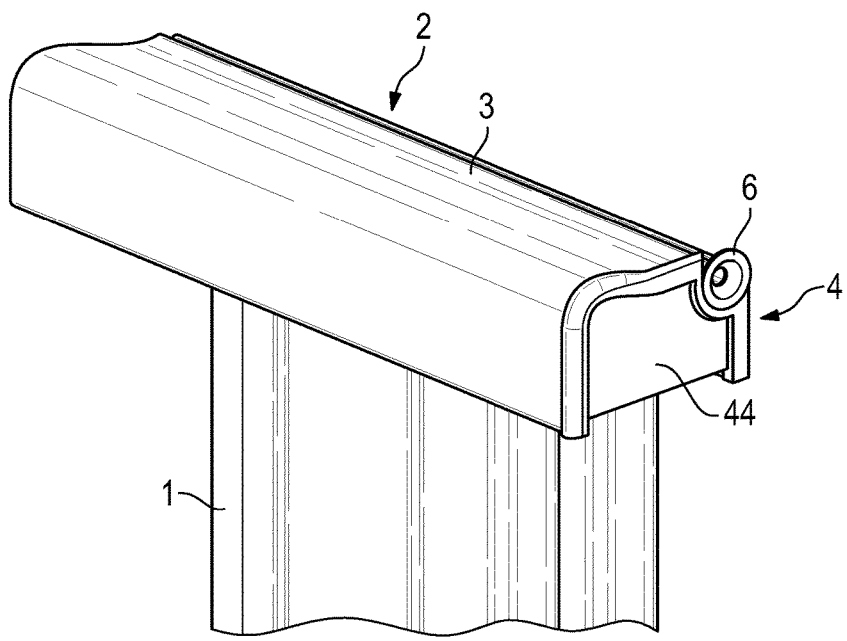
FIG. 4b shows a perspective view which shows the rollover protective body according to FIG. 4a after the installation of a reinforcing body.

With reference to FIGS. 4a and 4b, the third embodiment of the rollover protective body 1 differs from the first and second embodiments by a different cross-sectional shape of the hollow profile body 3 and by a reinforcing body 4 that is adapted to the cross-sectional shape and contour configuration of the hollow profile body 3. The reinforcing segments 41 of the reinforcing structure 40 are hexagonal or of at least partially hexagonal in the edge regions. Furthermore, a conical penetration element 6 is provided and can be fastened on an end to a wall of the hollow profile body 3 by a fastening screw (not illustrated). The conical penetration element 6 is provided on at least one of the two opposite ends of the hollow profile body 3 and is designed to penetrate the rear window of the motor vehicle in the event of a crash.

The reinforcing bodies 4 in the exemplary embodiments shown here are designed to reinforce the hollow profile body 3 of the deformation cross bar 2 in the event of overturning of the motor vehicle to improve the stability properties and the deformation properties of the deformation cross bar. The reinforcing bodies 4 therefore can provide effective reinforcement of the hollow profile body 3. Additionally, the reinforcing bodies 4 are composed of plastic, such as a fiber-reinforced polyamide, and therefore can be produced very simply and cost-effectively. Other functions can be integrated very simply into the reinforcing bodies 4 made of plastic, such as, an edge protection radius on the profile end of the hollow profile body 3 or an at least partial covering of penetration elements 6 for penetrating the rear window of the motor vehicle in the event of a crash. Furthermore, holding means 47, 47' can be integrated in a simple manner into the reinforcing bodies 4 made of plastic, with the holding means being designed for mutual fixing of two mutually opposite reinforcing bodies 4 by interlocking or clipping together. The configuration of the holding means 47, 47' is discussed in more detail further below.

Different geometrical configurations of the reinforcing segments 41 and the reinforcing structure 40 of the reinforcing bodies 4 is explained in detail below with reference to FIGS. 5 to 14. A Cartesian system of coordinates also has been drawn in these figures. The x direction is a longitudinal direction of the motor vehicle equipped with the rollover protective device, the y direction indicates the transverse direction of the motor vehicle, and the z direction represents the vertical direction of the vehicle.

Figure 5:
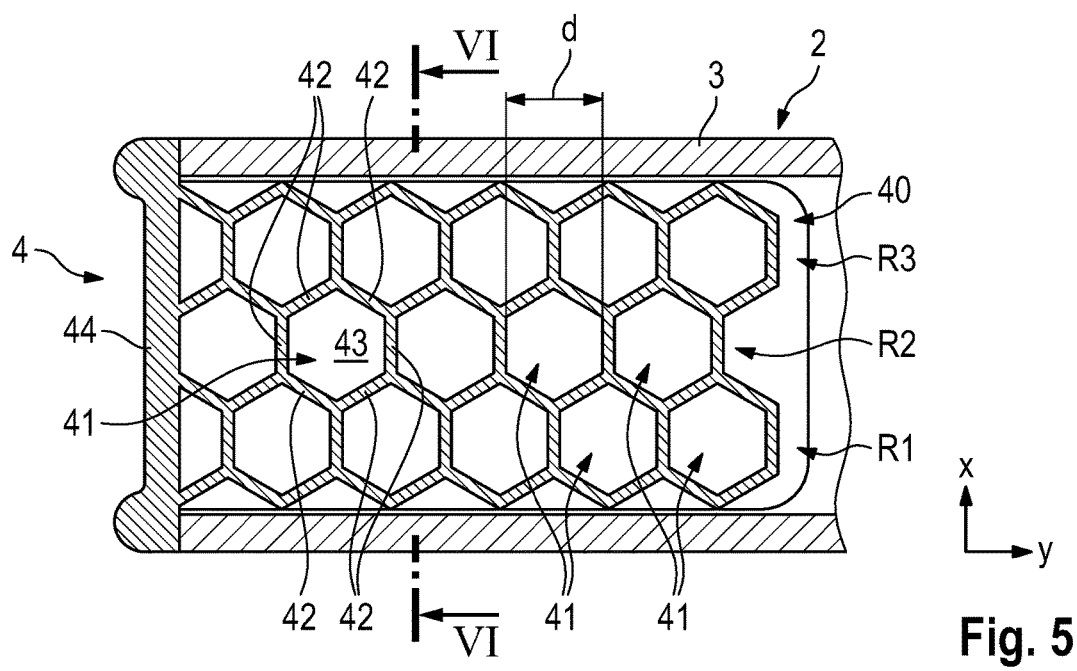
FIG. 5 shows a longitudinal section through a deformation cross bar of the rollover protective body according to a first variant embodiment.
Figure 6:
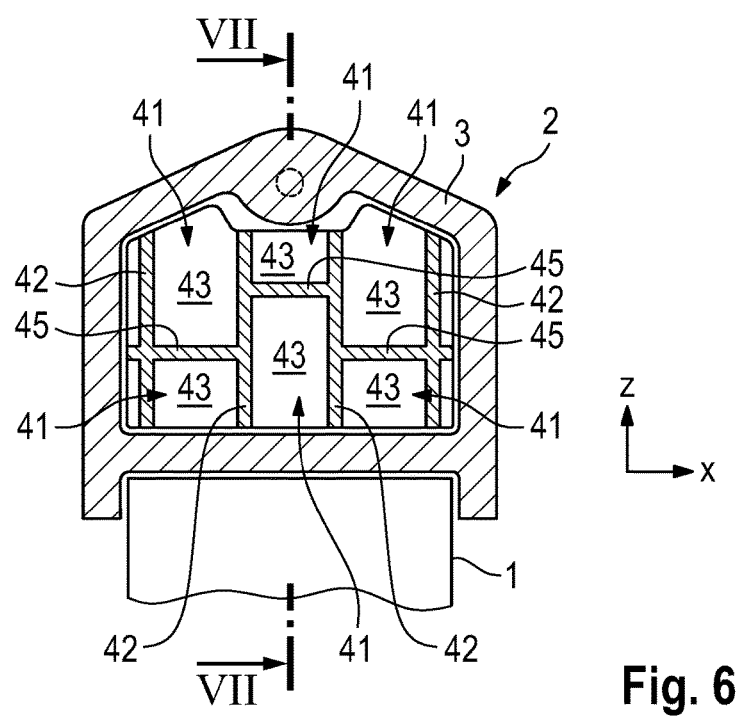
FIG. 6 shows the deformation cross bar according to FIG. 5 in cross section.
Figure 7:
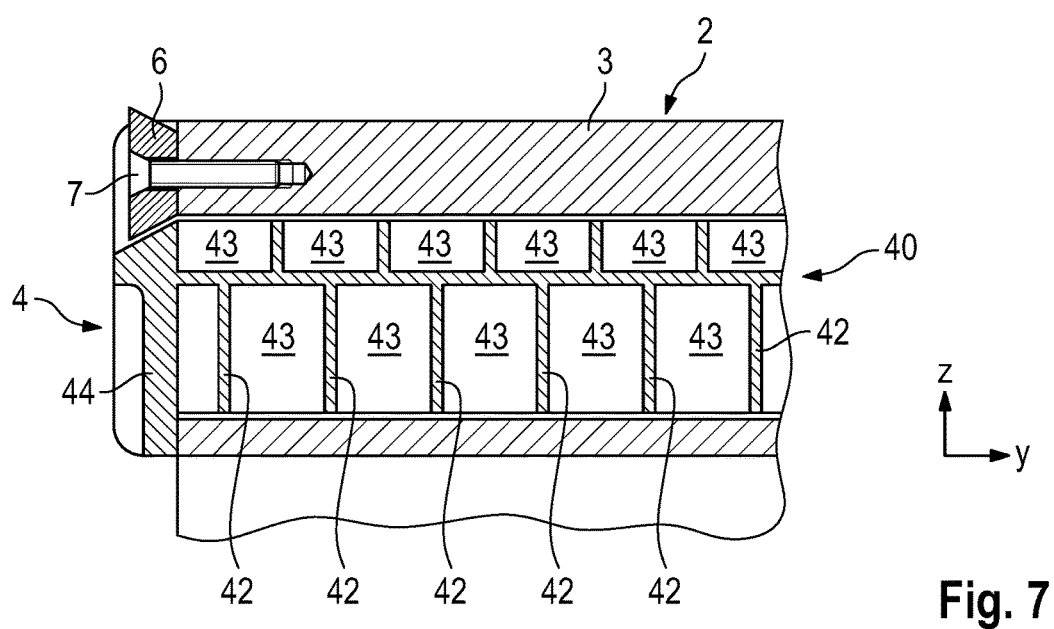
FIG. 7 shows a longitudinal section, rotated by 90° with respect to FIG. 5, through the deformation cross bar.

With reference to FIGS. 5 to 7, the reinforcing segments 41 according to a first variant embodiment are hexagonal or partially hexagonal in the outer edge regions. Each hexagonal reinforcing segment 41 has an inner cavity 43 bounded laterally by a total of six sidewalls 42, and adjacent reinforcing segments 41 are separated by a common lateral boundary wall 42. The reinforcing segments 41 are arranged next to one another in three adjacent rows R1, R2, R3 and offset with respect to one another in the transverse direction of the vehicle (y direction) because of their hexagonal structures. The size of the offset is d/2, where d indicates the length extent of the hexagonal reinforcing segments 41 in the transverse direction of the vehicle.

As shown in the cross-sectional view of FIG. 6, two hexagonal reinforcing segments 41 are arranged one above the other in the vertical direction and have a common lateral boundary wall 45 in the x-y plane. The lateral boundary wall 45 of the second (middle) row R2 has a height offset in the z direction in relation to the corresponding lateral boundary walls 45 of the first row R1 and of the third row R3. As a result, the deformation behavior of the reinforcing segments 41 can be improved in an advantageous manner.

The variant embodiment of FIG. 7 has a conical penetration element 6 attached on the end to a wall of the hollow profile body 3 by a fastening screw 7. The conical penetration element 6 is provided on at least one of the two mutually opposite ends of the hollow profile body 3 and is designed to penetrate the rear window of the motor vehicle in the event of a crash. Such a penetration element 6 also can be attached to each of the two mutually opposite ends of the hollow profile body 3. Such penetration elements 6 also can be provided in the other embodiments although they are not explicitly illustrated graphically.

Figure 8:
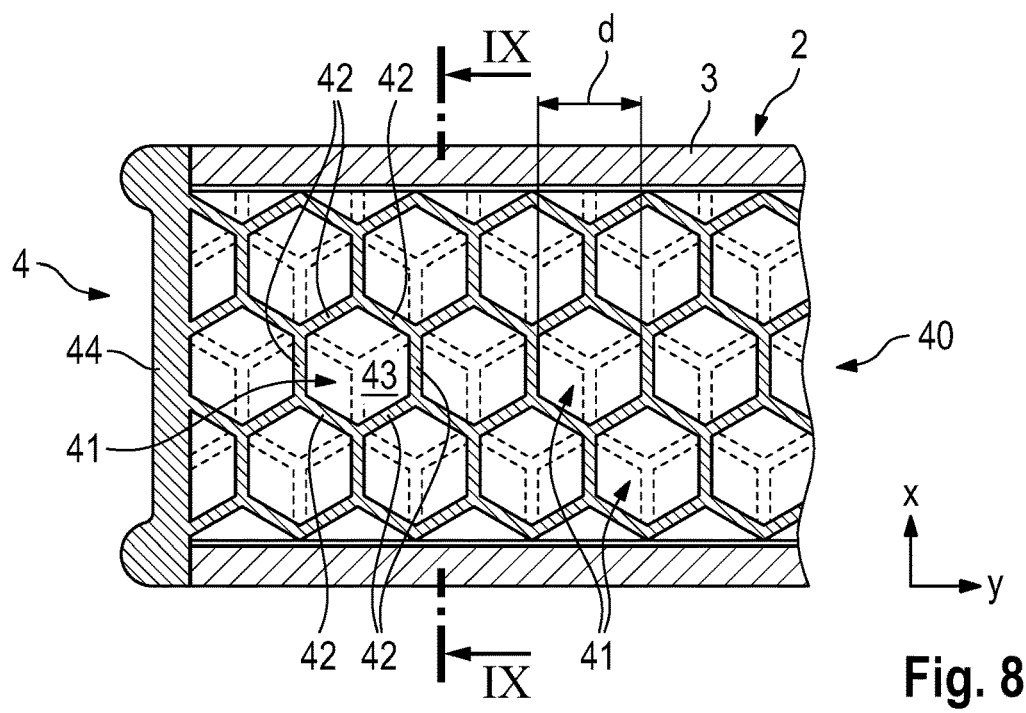
FIG. 8 shows a longitudinal section through a deformation cross bar of the rollover protective body according to a second variant embodiment.
Figure 9:
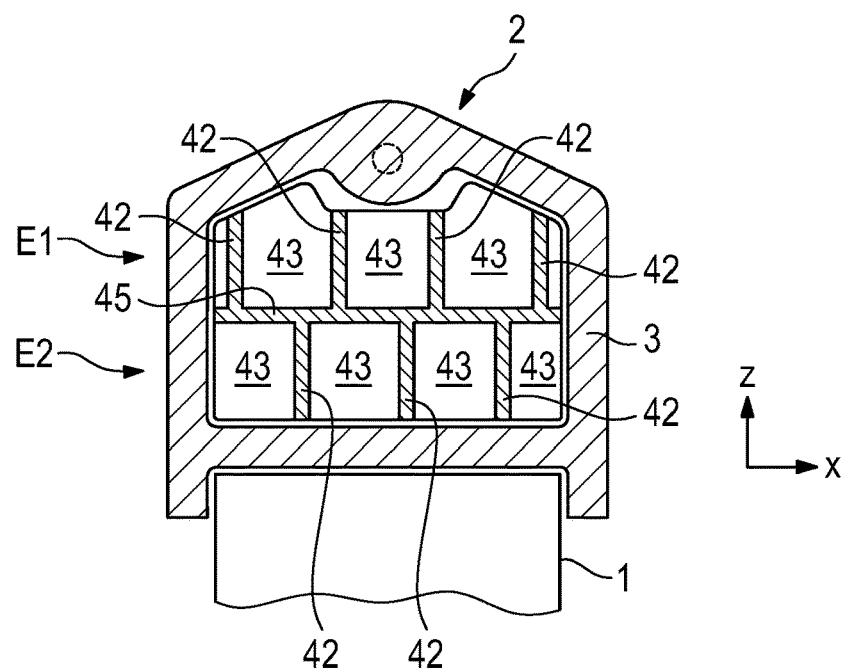
FIG. 9 shows the deformation cross bar according to FIG. 8 in cross section.

A second variant embodiment of the reinforcing segments 41 of the reinforcing structure 40 is explained with reference to FIGS. 8 and 9. The reinforcing segments 41 are hexagonal, but, in contrast to the first variant embodiment, cannot have any height offset at least of one of the lateral boundary walls 45 in the vertical direction (z direction). In the present case, the reinforcing segments 41 are arranged one above another in two planes E1, E2 and have an offset in the longitudinal direction of the vehicle (x direction). The size of the offset is d/2, where d is the length extent of the hexagonal reinforcing segments 41 in the longitudinal direction of the vehicle (x direction).

Figure 10:
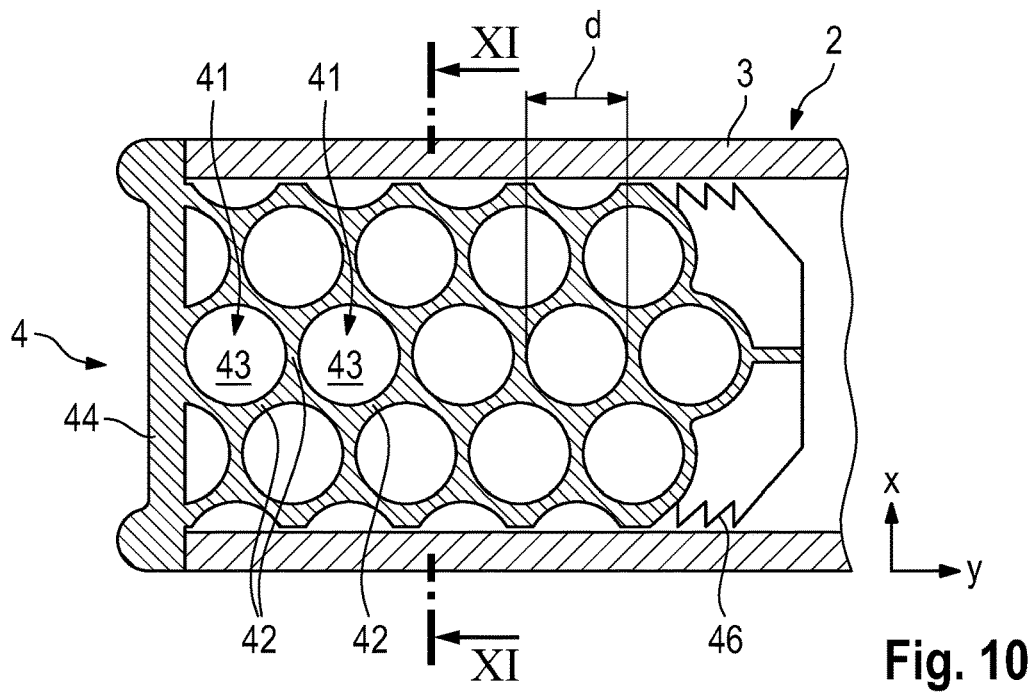
FIG. 10 shows a longitudinal section through a deformation cross bar of the rollover protective body according to a third and fourth variant embodiment.
Figure 11A:
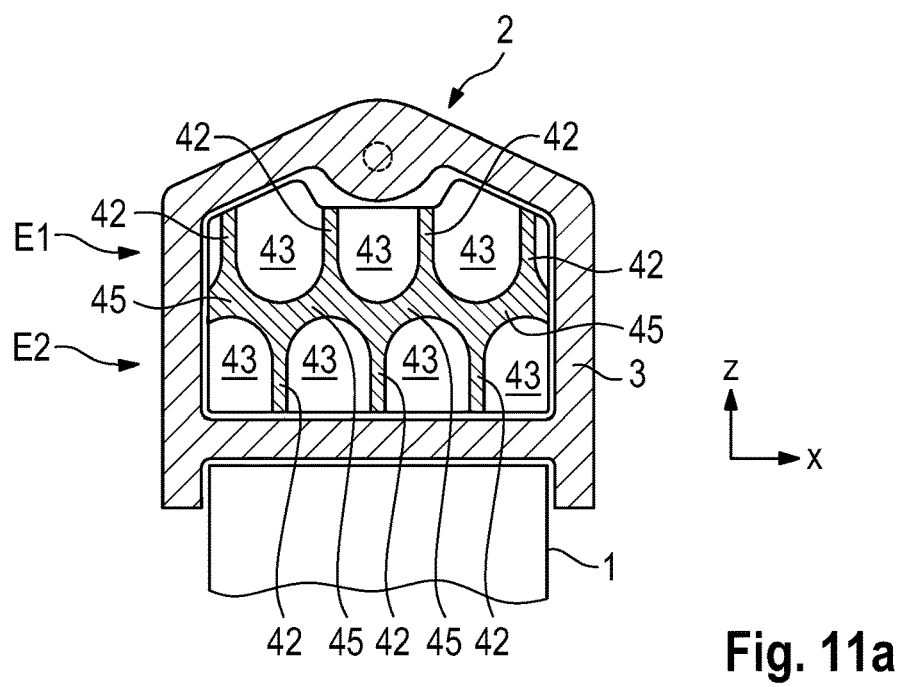
FIG. 11a shows the deformation cross bar according to the third variant embodiment in cross section.
Figure 11B:
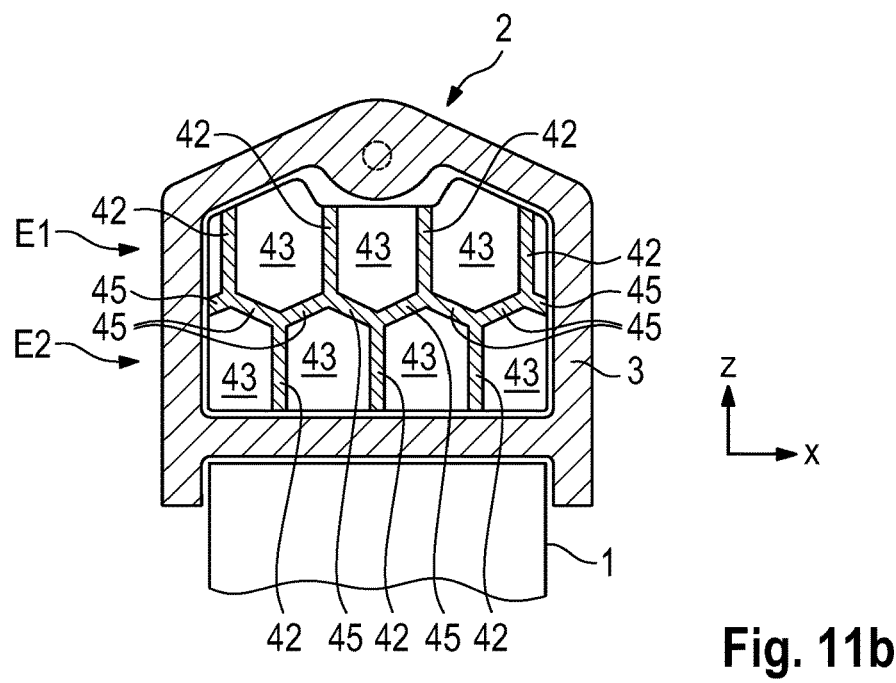
FIG. 11b shows the deformation cross bar according to the fourth variant embodiment in cross section.

Third and fourth variant embodiments of the reinforcing body 4 are explained in more detail below with reference to FIGS. 10, 11a and 11b. FIG. 10 is a top view illustrated in section and shows that the reinforcing segments 41 have a round contour. FIGS. 11a and 11b show that the reinforcing segments 41 are arranged one above another in two planes E1, E2 and have an offset d/2 in the longitudinal direction of the vehicle (x direction), where d is the diameter of the reinforcing segments 41. The third and fourth variant embodiments of the reinforcing body 4 differ by the different configuration of the common lateral boundary walls 45 of adjacent reinforcing segments 41 in the vertical direction. FIG. 11a shows that the lateral boundary walls 45 of the third variant embodiment are of rounded design in the vertical direction, whereas they are designed as rectilinear walls in the fourth variant embodiment of FIG. 11b. The sectioned top view according to FIG. 10 shows that groups of seven reinforcing segments 41 form a hexagonal geometric structure with a reinforcing segment 41 arranged in the center and six outer reinforcing segments 41. In these two variant embodiments, the reinforcing body 4 is held in the hollow profile body 3 by an inner holding structure 46 that is, for example, serrated laterally and can act on an inner side of the wall of the hollow profile body 3. Such a Christmas tree-like holding structure 46 serves for fixing the reinforcing body 4 within the hollow profile body 3. In addition, it can be positioned by suitable clipping either within the hollow profile body 3 or between two mutually opposite reinforcing bodies 4.

Figure 12:
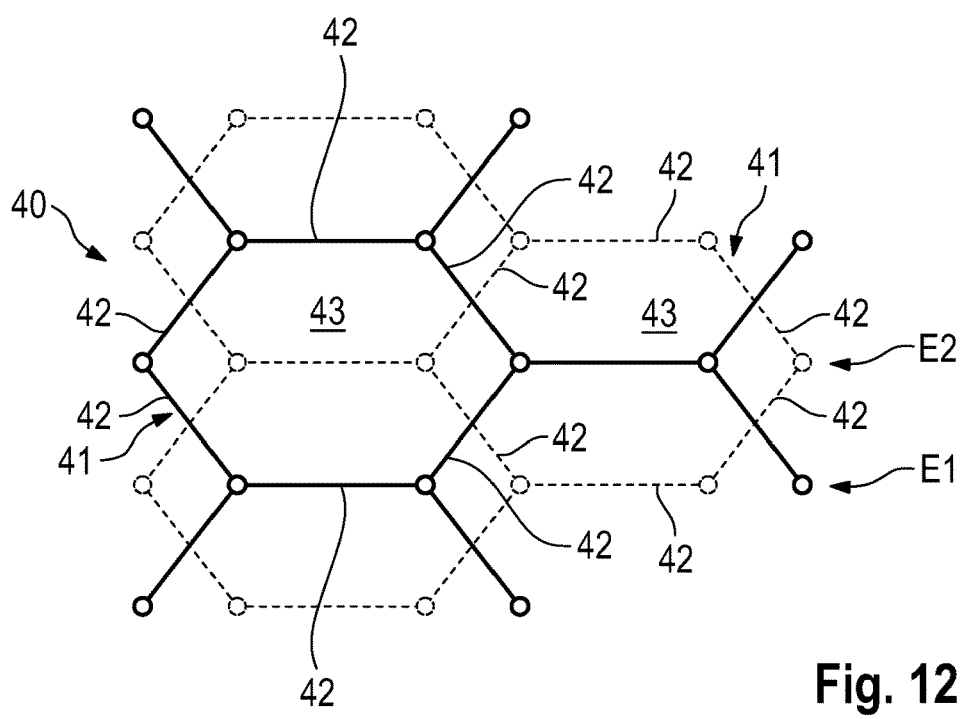
FIG. 12 shows a schematic illustration which illustrates a part of a reinforcing structure with hexagonal reinforcing segments.

FIG. 12 schematically illustrates reinforcing segments 41 that are hexagonal in shape and that are arranged in two planes E1, E2 and with lateral boundary walls 42 that bound the cavity 43. The planes E1, E2 have the offset discussed above.

Figure 13:
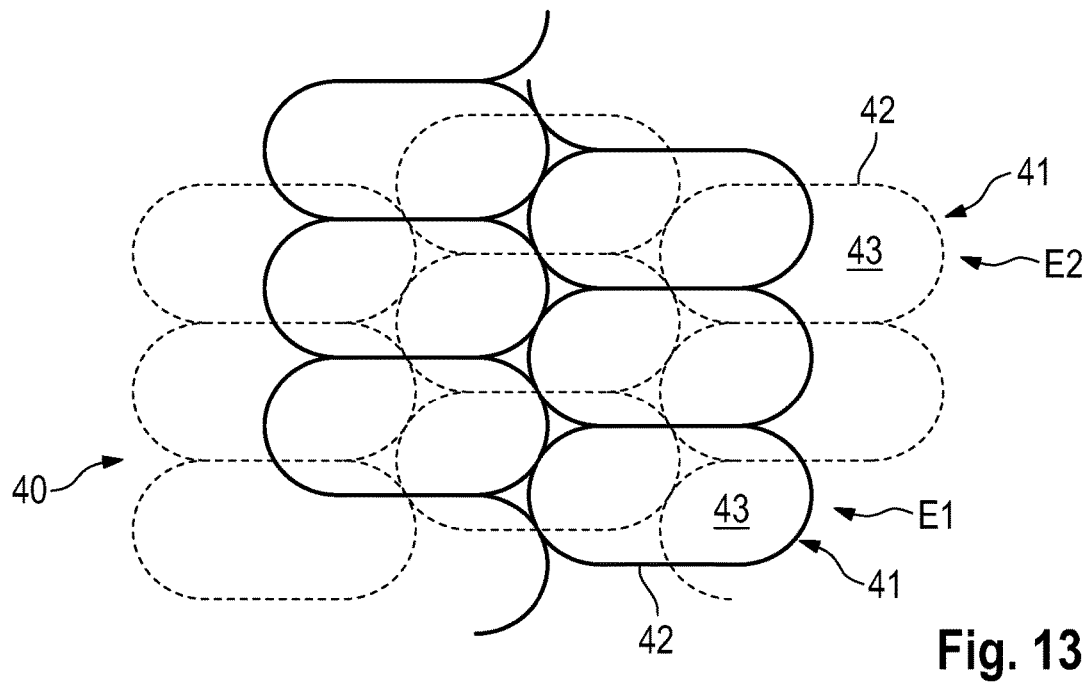
FIG. 13 shows a schematic illustration which illustrates a part of a reinforcing structure with oval reinforcing segments.

The variant embodiment of FIG. 13 shows that the reinforcing segments 41 can be oval and arranged above one another in two planes E1, E2. There is a lateral offset in the x and y direction between the two planes E1, E2.

Figure 14:
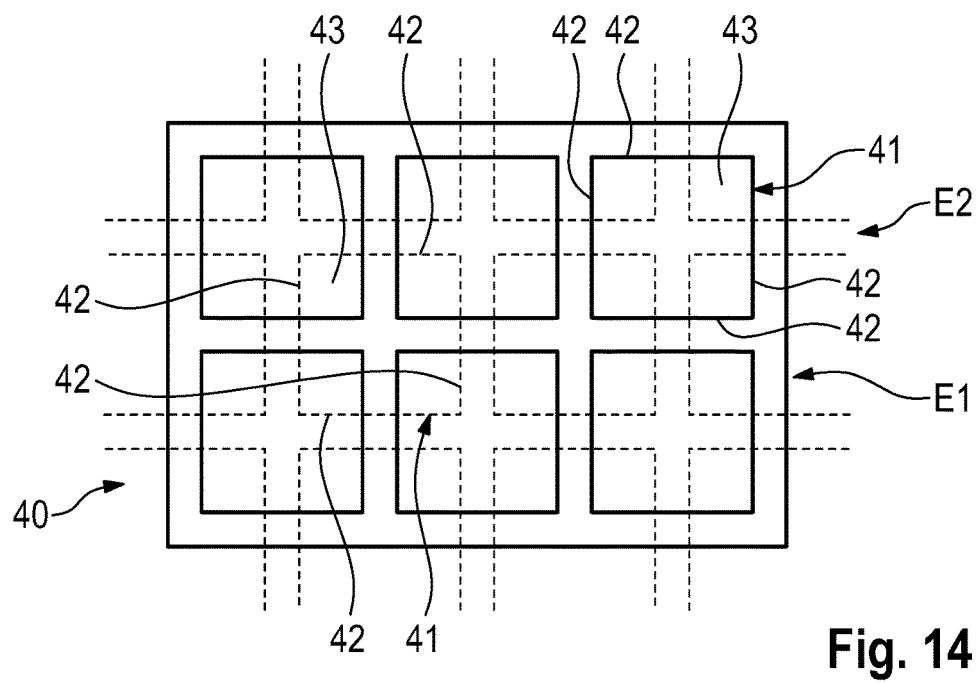
FIG. 14 shows a schematic illustration which illustrates a part of a reinforcing structure with rectangular reinforcing segments.

The reinforcing segments 41 can also be rectangular (e.g. square), as shown in FIG. 14 and can be arranged above one another in two planes E1, E2. There is a lateral offset in the x and y direction between the two planes E1, E2.

In the case of the variant embodiments shown in FIGS. 12 to 14, the lateral offset between the planes E1, E2 is selected in such a manner that the reinforcing segments 41 can penetrate into each other in the event of a crash, thus increasing the deformation of travel in an advantageous manner.

Suitable measures by which two reinforcing bodies 4 that are inserted into the hollow profile body 3 of the deformation cross bar 2 on the opposite ends can be connected to each other is described below with reference to FIGS. 15 to 19.

Figure 16:
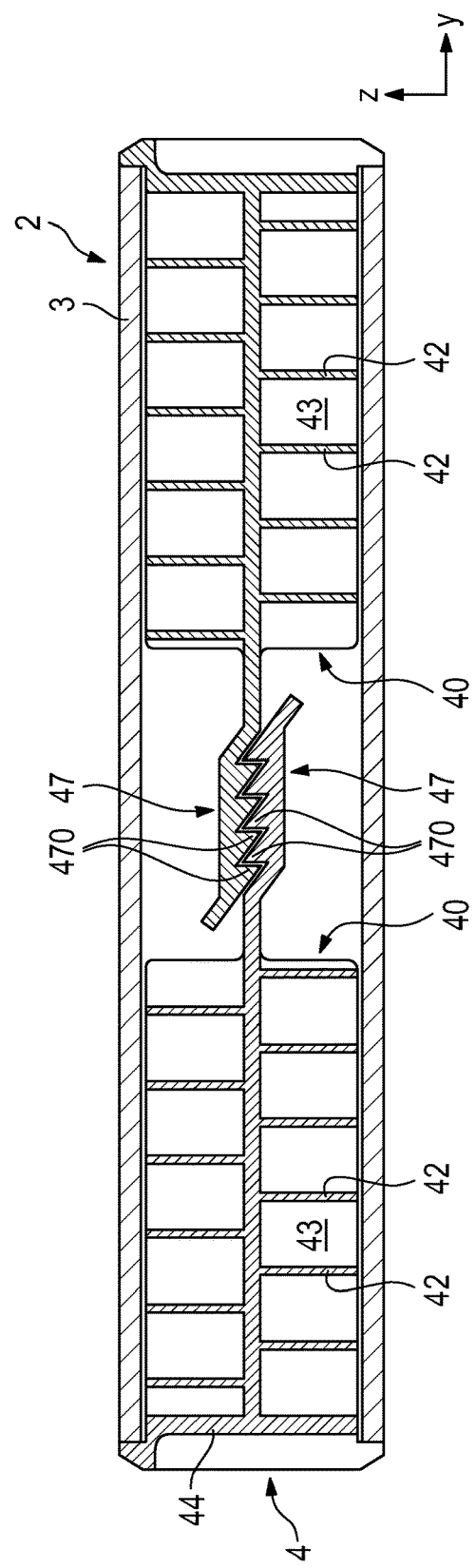
FIG. 16 shows a longitudinal section through a deformation cross bar of the rollover protective body with two reinforcing bodies which are likewise connected to each other with the aid of holding means.
Figure 17:
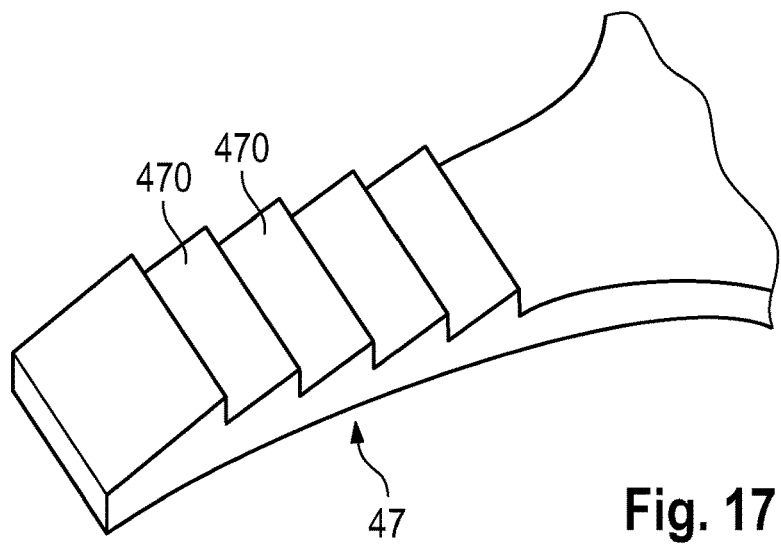
FIG. 17 shows a first variant embodiment of a holding means of the reinforcing bodies, which variant embodiment is used in the embodiment according to FIG. 16.

In the exemplary embodiment shown in FIG. 16, each of the two reinforcing bodies 4 has, at its inner end, a respective holding means 47 that is configured to be connected in a frictional and/or form-fitting manner to the holding means 47 of the other of the two reinforcing bodies 4. In this variant embodiment, the holding means 47 have a plurality of holding teeth 470 that can interlock with each other in the predetermined installation position, as shown in FIG. 16. One of the holding means 47 can be seen in detail in FIG. 17. The holding means 47 provided with the holding teeth 470 make it possible for the two reinforcing bodies 4 to latch together in the predetermined installation position, thus resulting in effective protection against becoming lost.

Figure 15:
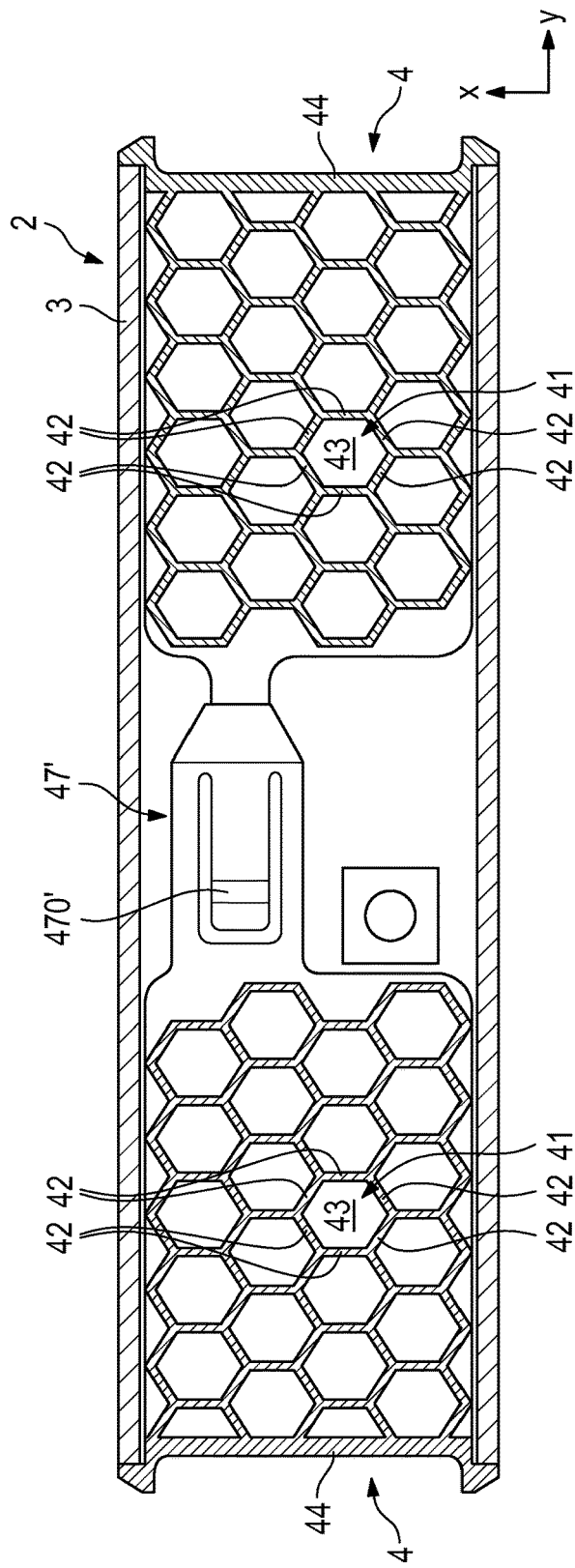
FIG. 15 shows a longitudinal section through a deformation cross bar of the rollover protective body with two reinforcing bodies which are connected to each other with the aid of holding means.
Figure 18:
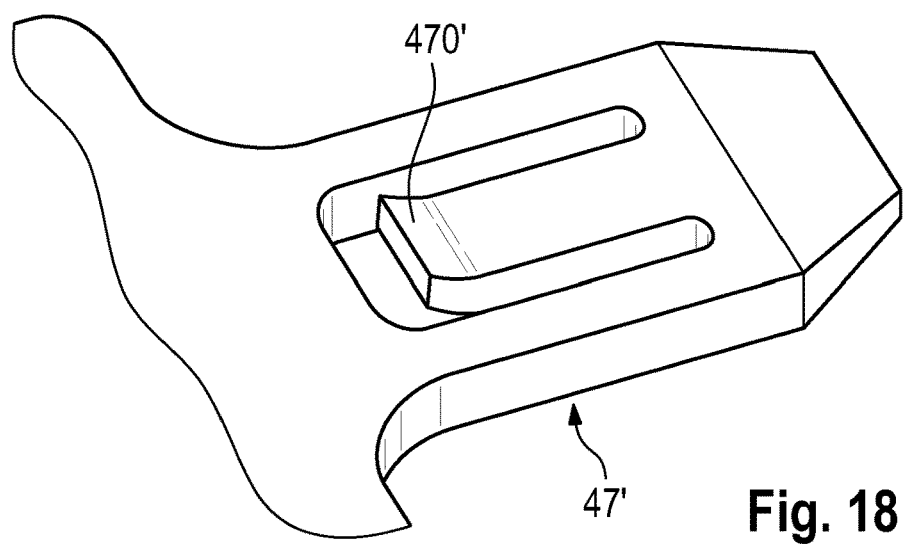
FIG. 18 shows a second variant embodiment of a holding means of the reinforcing bodies, which variant embodiment is used in the embodiment according to FIG. 15.
Figure 19:
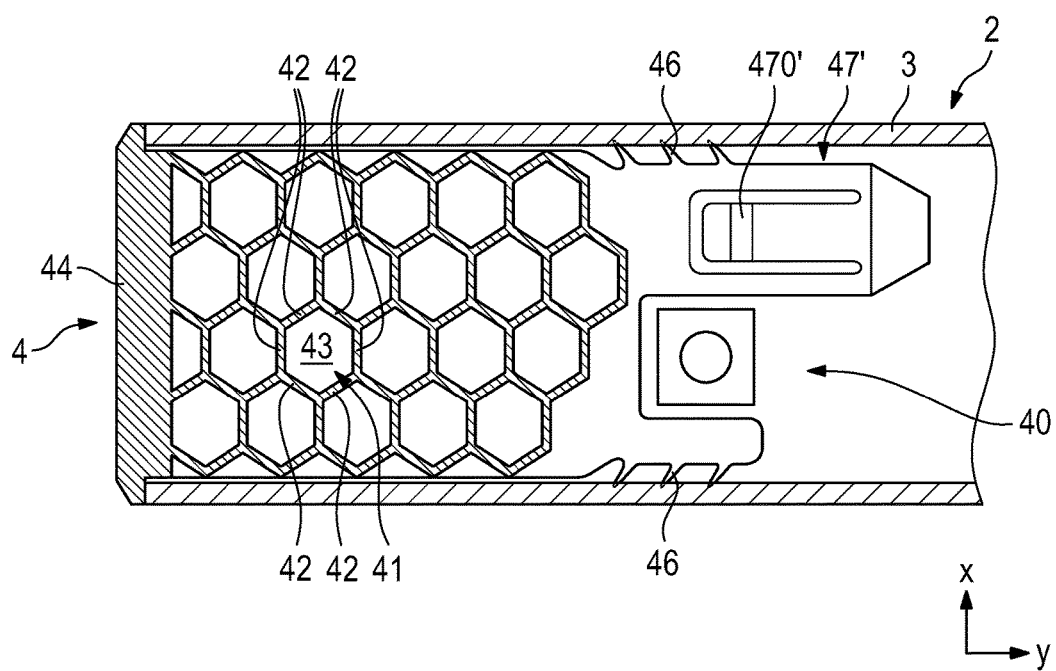
FIG. 19 shows a longitudinal section through a part of a deformation cross bar with a reinforcing body which is accommodated in said part and has a holding means according to the second variant embodiment according to FIG. 18.

According to the variant embodiment shown in FIGS. 15, 18 and 19, the holding means 47' can also comprise a latching tongue 470' by means of which a frictional and/or form-fitting connection, in particular a latching connection, with the other reinforcing body 4 can be produced. FIG. 19 also shows the laterally serrated inner holding structure 46 that can act on the inner side of the wall of the hollow profile body 3. The Christmas tree-like holding structure 46 can be provided in all of the embodiments functions to fix the reinforcing body 4 within the hollow profile body 3. As a result, micromovements of the reinforcing body 4 can be prevented in an advantageous manner.

What is claimed is:

1. A rollover protective device of a motor vehicle, comprising a substantially vertical rollover protective body having a top end; a deformation cross bar extending substantially linearly and horizontally at the top end of the rollover protective body, the deformation cross bar having a hollow profile body with an interior; and at least one reinforcing body configured to be inserted substantially linearly into the interior of the hollow profile body, the reinforcing body having an outer shape conforming to the interior of the hollow profile body so that the reinforcing body contacts the interior of the hollow profile body, the reinforcing body having a plurality of reinforcing segments with boundary walls forming cavities that define a honey comb structure with the cavities opening in directions transverse to the substantially linearly extending deformation cross bar.

2. The rollover protective device of claim 1, wherein the at least one reinforcing body comprises a plurality of reinforcing bodies inserted into the hollow profile body.

3. The rollover protective device of claim 2, wherein each of the reinforcing bodies is produced from plastic.

4. The rollover protective device of claim 1, wherein the reinforcing segments are arranged in at least two rows next to one another, each of the rows having plural reinforcing segments arranged one above another in pairs and each having a common lateral boundary wall.

5. The rollover protective device of claim 4, wherein each of the lateral boundary walls has a height offset in relation to the other lateral boundary walls.

6. The rollover protective device of claim 1, wherein the reinforcing segments are arranged one above another in at least two planes, and the planes have a lateral offset from one another in at least one direction.

7. The rollover protective device of claim 6, wherein the lateral offset between the planes is selected so that the reinforcing segments can penetrate into one another under the action of a load.

8. The rollover protective device of claim 1, wherein the reinforcing segments are hexagonal, oval, circular or rectangular.

9. The rollover protective body of claim 1, further comprising at least one conical penetration element attached to an end of the hollow profile body.

\* \* \* \* \*